United States Patent [19]

Moss et al.

[11] 4,357,903

[45] Nov. 9, 1982

[54] DEVICE FOR PRODUCING A FLUID STREAM OF VARYING COMPOSITION

[75] Inventors: Owen R. Moss; Mark L. Clark, both of Kennewick; E. John Rossignol, Richland, all of Wash.

[73] Assignee: Hazleton Systems, Inc., Aberdeen, Md.

[21] Appl. No.: 266,540

[22] Filed: May 22, 1981

[51] Int. Cl.³ .............................................. A01K 1/03
[52] U.S. Cl. ........................................ 119/15; 119/17
[58] Field of Search ............................. 119/15, 17, 37

[56] References Cited

U.S. PATENT DOCUMENTS 3,584,927 6/1971 Ott et al. ........................... 119/37 X
4,216,741 8/1980 Moss ..................................... 119/15

Primary Examiner—Hugh R. Chamblee
Attorney, Agent, or Firm—Joseph J. Hauth; Robert Keith Sharp

[57] ABSTRACT

A device for producing a fluid stream of varying composition comprises a chamber having an inlet at one end and outlet at the other. Between the inlet and outlet there are substantially planar pans or baffles positioned normal to the bulk flow of fluid between the inlet and the outlet. These pans are arranged in pairs. Each pan, except those of the pair most remote from the inlet, is spaced from the walls of the chamber to permit air to flow past it. The pans of each pair are also spaced from each other, in a direction parallel to their planes, leaving an empty space along the mid-plane of the chamber. This produces a circulation and mixing of fluid between the pairs of pans or baffles. A secondary stream of fluid is introduced between two pairs of baffles in the intermediate portion of the chamber, so that the composition of the fluid is different in the portion adjacent to the outlet and the portion adjacent to the inlet. In a specific embodiment, the device is an exposure chamber for experimental animals, and the pans or baffles are catch pans for excrement.

18 Claims, 3 Drawing Figures

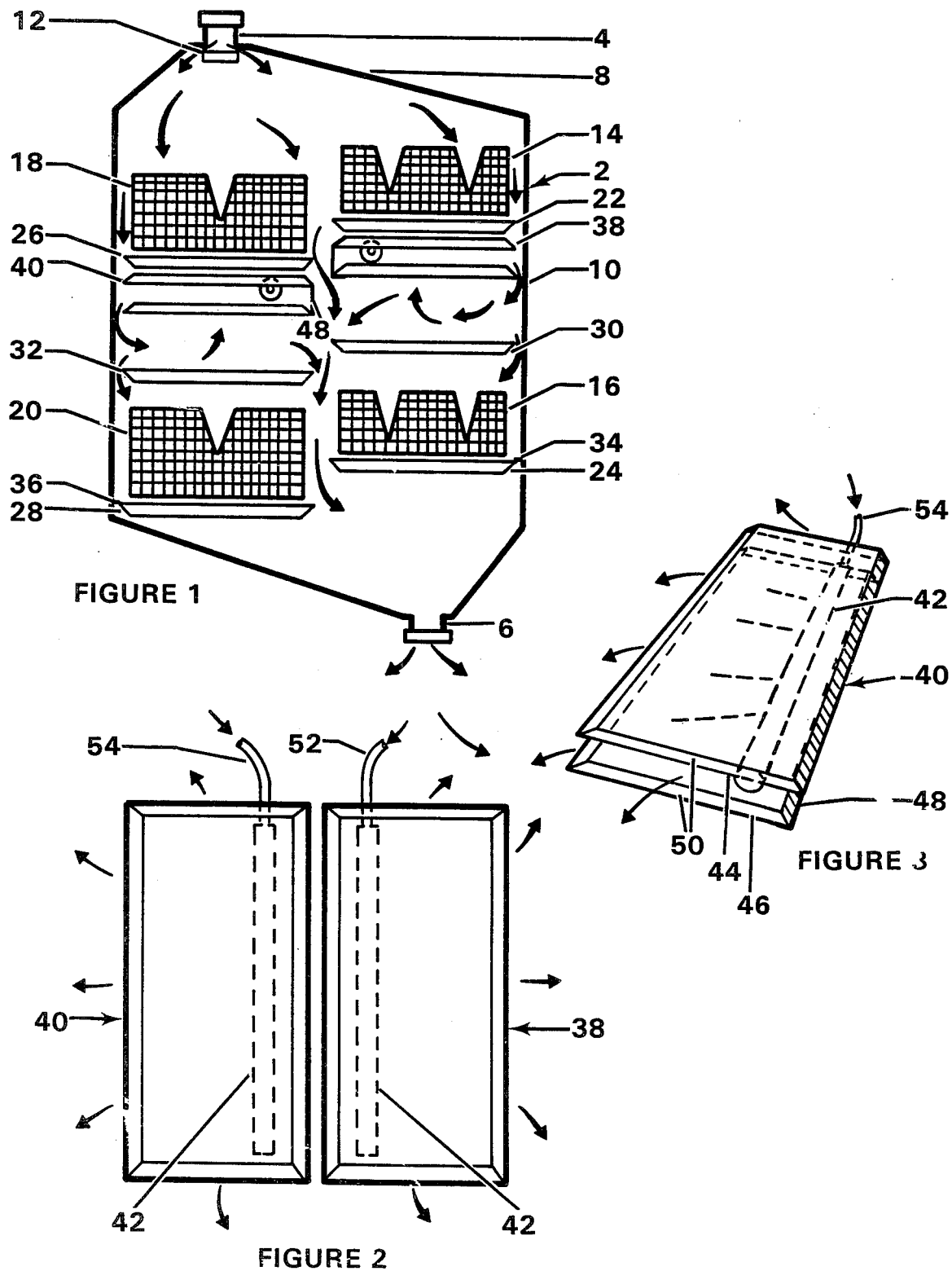

DEVICE FOR PRODUCING A FLUID STREAM OF VARYING COMPOSITION

BACKGROUND

U.S. Pat. No. 4,216,741 to Owen R. Moss, discloses an exposure chamber in which a succession of trays serve as distributing means to achieve uniform concentration throughout the chamber of a gas which includes an additive, e.g. aerosol. While intended primarily for the exposure of experimental animals to a controlled atmosphere, it may be used substantially unchanged for other purposes, e.g. the exposure or treatment of plants or the treatment of materials, for example the smoking of meat or fish.

The chamber is characterized by an opening at one end, e.g. the top, and an outlet at the other end, e.g. the bottom. In this configuration the gaseous composition is introduced at the top and deflected towards the side walls of the chamber, trays are arranged horizontally within the chamber, spaced from the side walls and spaced from each other along the mid-plane of the chamber. The gaseous composition flows downwardly through both sets of passages. The trays serve to create a turbulence or circulating movement within the chamber which results in thorough mixing.

SUMMARY OF THE INVENTION

We have now found that the chamber described above can be modified so that different compositions are present in different zones, but in which the composition is uniform within a given zone. We accomplish this by the provision of additional inlets, intermediate to the inlet and outlet of the chamber as described above. An intermediate section of the chamber (which is not used for exposure) serves as a mixing zone. For example, an aerosol of given concentration can be introduced at the top of the chamber. Substantially pure air or gas is introduced through the intermediate inlets. In the upper portion of the chamber, the aerosol has a substantially uniform concentration. In the lower portion, the concentration is lower, but also substantially uniform. For animal experiments the above arrangement is preferred. However, it will be understood that instead of introducing pure air at the auxiliary inlets an aerosol of higher concentration could be introduced so that the concentration in the lower portion of the chamber is greater than in the upper portion.

The number of plates or trays can be increased and the number of points of introduction of the auxiliary gas can also be increased so that several different concentrations may be present in a given chamber.

The system can be used for other purposes than as an exposure chamber. For example, in some chemical processes it may be desirable to produce a fluid flow the composition of which periodically changes along its path. The system as described could be used to introduce additional components at different points in the chamber.

As pointed out in the patent, the inlet can also, though less desirably, be at the bottom and the outlet at the top. Moreover, if the system is to be used for general gas or liquid mixing, the bulk flow can be horizontal and the "trays," now simply baffles, positioned vertically. The essential requirement is that they be substantially normal to the direction of bulk flow.

DETAILED DESCRIPTION

The presently preferred embodiment of this invention is a modification of the animal exposure chamber shown and described in U.S. Pat. No. 4,216,741 referred to above. The disclosure of the patent, which is specifically incorporated herein by reference, illustrates the mechanical details of the chamber except where they are changed as shown in the drawings and described in the remainder of the specification of this case.

The chamber constituting the present invention, like that of the patent, includes a casing 2, having an air inlet 4 at its top and an air outlet 6, at or near the bottom. The upper wall 8 of casing 2 slopes downwardly and outwardly in all four directions from the inlet 4. Immediately beneath inlet 4 is a deflector 12 which directs air toward the sloping top wall 8.

Within the casing 2 are a series of animal cages 14, 16, 18 and 20, beneath which are catch pans 22, 24, 26 and 28. In the structure shown in the patent, the cages and their catch pans fill substantially the entire chamber. In the present case, however, there is an empty space in the portion where cages would have appeared between cage 14 and cage 16 and between cage 18 and cage 20. A "dummy catch pan" or baffle 30, 32, however, is provided above each of the cages 16 and 20. Catch pans 22 and 26 and baffles 30 and 32 are, like the catch pans of the reference patent, spaced from the walls of the chamber by distances which are small compared to the horizontal dimension of the pans, but great enough to supply sufficient air to pans downstream. Pans 24 and 28, however, are provided with baffle plates 34 and 36 to prevent flow of air between them and the sidewalls. Typical dimensions of the structure as defined thusfar, are disclosed in columns 4 and 5 of the referenced patent.

The novel feature of this invention is the introduction of secondary air. The means for doing this will now be described.

A secondary air distributor 38 is provided between catch pan 22 and baffle 30. Another secondary air distributor 40 is provided between catch pan 26 and baffle 32.

FIG. 3 is a perspective view of distributor 40. Distributor 38 is identical except it is reversed from left to right with respect to distributor 40. We have successfully used as a distributor a "sandwich" consisting of a porous sintered metal tube 42 between two inverted catch pans 44 and 46. The space between the edges nearest the center line of the chamber is closed, 48. The spaces between the other three edges are open and the downturned edges 50 serve to direct air downwardly along the sidewalls. We have found that this downward deflection of the air is important to prevent upward circulation which would dilute upstream air. Inlet tubes 52 and 54 are connected to porous tubes 42 and pass through the chamber walls.

The operation of the chamber is as follows: An aerosol of a given composition is introduced through inlet 4. It is deflected laterally by deflector 12 and downwardly and laterally by upper wall 8. Circulation above catch pans 22 and 26 produces a uniform composition in this volume. Part of the aerosol flows downwardly between pans 22 and 26 and the sidewalls 10, while another portion flows downwardly through the central portion of the chamber between the inner edges of pans 22 and 26. Secondary clean air is introduced through inlet tubes 52 and 54 to distributors 38 and 40, respectively. It is directed downwardly into the space between baffles 30 and 32 and the catch pans 22 and 26. A circulation takes place in this volume mixing the secondary air with the aerosol from above pans 22 and 26. The aerosol, now diluted by the secondary air, flows downwardly around baffles 30 and 32 into the space occupied by cages 16 and 20. Due to the presence of baffles 34 and 36 it can not escape around catch pans 24 and 28 and all flows downwardly between these catch pans and eventually out of the chamber through outlet 6.

EXPERIMENTAL EXAMPLES

In the experiments described below, a Battelle exposure chamber having the structure and dimensions described in the U.S. Patent referenced above was modified by removing the cages forming the middle layer and means were provided for introducing secondary air through sampling ports which were provided in doors 41, 43, 45 and the fourth door (not shown) of the above patent. This gave essentially the arrangement shown and described above in this specification. As will be noted, however, the specific means for introducing air was not always that shown and described above.

EXAMPLE 1

In this series of experiments, the air introduction device was a downwardly directed Y-shaped pair of tubes provided just inside each of the four doors referred to above. An ammonium sulfate aerosol (0.4 $\mu$m amad, GSD=1.7 to 2.0) was used. The aerosol was introduced into the chamber with a total air flow of 10 cfm=283 l/min. After a steady state concentration of 1 to 3 g/l was reached, one half of the total flow was introduced through the secondary inlets described above. Changes in concentration (in micro amperes) were measured with a sulfur analyzer (a linear relation exists between changes in micro amperes and concentration). In this experiment, a constant flow of 10 cfm was drawn off at outlet 6. A constant amount per minute of ammonium sulfate was introduced into the air sucked in at inlet 4. When the dilution air was "on," the same amount of ammonium sulfate was suspended in 5 cubic feet per minute of air introduced at inlet 4, and 5 cubic feet per minute of pure air was introduced in the empty portion of the chamber between pans 22 and 30 and between pans 26 and 32. The analysis was in each case at 2 cm above the middle of each of the cages 14, 16, 18 and 20 and centered on the length and width of the above cage. The results are shown on Table 1.

TABLE 1

Sulfur analyzer current $\mu$amps ($\pm$ 0.1) (aerosol sample 2 cm above and centered on length and width of cage unit).

| Level In Chamber | Measurement Sequence | Dilution Air Off | Dilution Air On |
|---|---|---|---|
| Cage 14 | 2 | 5.3 | 9.4 |
| Cage 18 | 3 | 6.2 | 10.0 |
| Cage 16 | 1 | 6.2 | 5.8 |
| Cage 20 | 4 | 5.9 | 5.5 |

The following conclusions were drawn: When approximately one half of the total chamber flow is introduced as dilution air into the middle of the Battelle exposure chamber the following changes are observed:
1. The concentrations 2 cm above the middle of cage units 14 and 18 increase by 61 to 79 percent.
2. The concentration 2 cm above the middle of the cage units 16 and 20 decreases slightly (2 to 13 percent).

In order to determine the uniformity of the concentration in cage 20, a greater number of sampling probes was provided. As before, each was 2 cm above the middle of the cage. The position of the sampling probes and the analyses are shown in Table 2.

TABLE 2

Sulfur analyzer current $\mu$ amps ($\pm$ 0.1)

| POSITION OF SAMPLING PROBE, CAGE 20 | DILUTION AIR OFF | DILUTION AIR ON |
|---|---|---|
| Rear Left | 5.3 | 4.55 |
| Rear Center | 5.25 | 4.45 |
| Rear Right | 5.25 | 4.45 |
| Middle Left | 5.2 | 4.8 |
| Middle Center | 5.2 | 4.8 |
| Middle Right | 5.3 | 4.85 |

The following conclusions were drawn: With open tube dilution air lines, the concentration in cage 20 is reduced 8 to 15 percent. The concentrations 2 cm above the rear of the cage are 5 to 7 percent less than the concentrations above the middle.

EXAMPLE 2

After a number of experiments using different dilution systems, that are shown and described above, that is to say, the porous sintered tube sandwiched between two catch pans, was found to give the best results. Using this improved system, a vapor of tetrachloroethylene was employed. It was introduced into the air by a hot wick vapor generator. A photoionization detector was used for measuring concentration. In this experiment, a total air-vapor flow of 283 l/m (10 cfm) was used with 141 l/m (5 cfm) introduced at inlet 4 and the balance of pure air is divided evenly between inlet tubes 52 and 54. A total of 36 sampling points was used. The distribution of the sampling points and the measured concentrations (in the recorder units) are shown on Table 3.

TABLE 3

Chamber concentration (relative chart recorder units, for tetrachloroethylene).

| CAGE 18 | | CAGE 14 | | CAGES 14 AND 18 |
|---|---|---|---|---|
| Left | Center | Center | Right | |
| 7.8  7.6 | 7.6 back | 7.2  7.3 | 7.3 back | $\bar{x}$ = 7.5 |
| 7.8  7.8 | 7.6 center | 7.7  7.8 | 7.8 center | s = 0.2 |
| 7.6  7.7 | 7.7 front | 7.2  7.3 | 7.2 front | max = 7.8 |
| $\bar{x}$ = 7.6 | | $\bar{x}$ = 7.4 | | min = 7.2 |
| s = 0.1 | | s = 0.3 | | |
| max = 7.8 | | max = 7.8 | | |
| min = 7.6 | | min = 7.2 | | |

| CAGE 20 | | CAGE 16 | | CAGES 20 AND 16 |
|---|---|---|---|---|
| Left | Center | Center | Right | |
| 3.9  4.1 | 4.3 back | 4.2  4.1 | 4.0 back | $\bar{x}$ = 4.0 |
| 3.6  3.8 | 3.8 center | 3.8  3.7 | 3.7 center | s = 0.2 |
| 4.1  3.8 | 3.8 front | 4.4  4.2 | 4.0 front | max = 4.4 |
| $\bar{x}$ = 3.9 | | $\bar{x}$ = 4.0 | | min = 3.6 |
| s = 0.2 | | s = 0.2 | | |
| max = 4.3 | | max = 4.4 | | |
| min = 3.6 | | min = 3.8 | | |

NOTE:
$\bar{x}$ = Average
s = Standard Deviation

The following conclusions were drawn: A factor of two in concentration was maintained between the top level (cages 14 and 18) and the bottom level (cages 16 and 20). The uniformity at the top level was within 5 percent and the bottom level was within 10 percent. These tests were made to show viability of the approach and not to find the optimal configuration of the sintered tube-catch pan sandwich. The two-concentration-level system is inherently safe. Should the dilution air system fail, the missing air is automatically and passively made up at the top inlet of the chamber causing the concentration in the chamber to fall to the lower of the two values.

While the animal exposure chamber described in the detailed description above constitutes the best mode in which we have up to now contemplated applying the invention, there are various embodiments that can be used. Considering only the animal exposure chamber, it can be provided with a greater number of cages and more than one inlet level for secondary air, so that three or more concentrations may be provided in a single chamber. As stated in the referenced patent, the flow of air may, less desirably, be from the bottom to the top (with certain structural changes described in that patent). The chamber, virtually without change, can be used for purposes other than the exposure of experimental animals. For example, it may be used for the exposure or treatment of plants, the smoking or other curing of meat, fish, fruit, vegetables and so forth.

The invention may also be applied in more unrelated fields. It may be used to produce a stream of fluid, either gaseous or liquid, which varies in composition along its length, for example, in chemical processes. When used for fluid blending without exposure of animals, plants, or materials, the chamber may be in either of the orientations referred to above, or it may be positioned on its side, relative to the position shown in the drawings, so that the flow between inlet 4 and outlet 6 is horizontal or in any other desired direction.

We therefore, wish our invention to be limited solely by the scope of the following claims.

The embodiments of the invention in which a proprietary right or privilege is claimed are defined as follows:

1. A device for producing a fluid stream having composition which varies along its path, said device comprising:
   (a) a chamber having substantially imperforate inlet and outlet end members;
   (b) imperforate sidewalls joining said inlet and outlet members, thereby forming a closed chamber;
   (c) a fluid inlet in said inlet end member;
   (d) a fluid outlet in said outlet end member;
   (e) means for introducing fluid of a first composition into said inlet;
   (f) means for withdrawing fluid from said outlet, thereby establishing a direction of bulk fluid flow extending from said inlet to said outlet;
   (g) an inlet deflector adjacent to said fluid inlet constructed and arranged to deflect fluid introduced at said inlet toward said sidewalls;
   (h) a plurality of substantially imperforate substantially planar baffles within said chamber substantially normal to said direction of bulk fluid flow, said baffles being arranged in pairs positioned transverse to said direction of bulk flow, there being an initial pair of baffles adjacent said inlet, a terminal pair of baffles adjacent said outlet, and at least one intermediate pair of baffles, all said pairs being spaced apart in the direction of bulk fluid flow, the baffles of each pair being spaced apart from each other transversely to said direction of bulk fluid by a distance which is sufficient to exhaust air from said pair and the baffles upstream thereof, but which is small compared to the dimensions of said baffles transverse to said direction of bulk fluid flow, each baffle other than those of said terminal pair being spaced from said imperforate sidewalls by distances which are sufficient to permit fluid flow along said walls sufficient to supply fluid to baffles downstream of it, but which are small compared to the dimensions of said baffles transverse to said direction of bulk fluid flow;
   (i) means constructed and arranged to prevent fluid flow between said imperforate sidewalls and the baffles of said terminal pair;
   (j) means for introducing a fluid of a second composition, different than said first composition, in the space between each of the baffles of at least one intermediate pair and the baffle immediately upstream thereof, said space being otherwise substantially unobstructed.

2. A device as defined in claim 1 and comprising means for drawing fluid from said outlet at a constant rate.

3. A device as defined in claim 1 wherein said means for introducing a fluid of a second composition is constructed and arranged to direct said fluid toward said sidewalls and toward said outlet.

4. An exposure chamber comprising:
   (a) imperforate substantially vertical front, rear and sidewalls and closed upper and lower ends;
   (b) a gas inlet in one of said ends;
   (c) a gas outlet in the other of said ends;
   (d) an inlet deflector adjacent said inlet constructed and arranged to deflect gas introduced at said inlet toward substantially vertical walls;
   (e) a plurality of imperforate substantially horizontal pans within said chamber, said pans being arranged in pairs vertically spaced from each other, the pans of each pair being horizontally spaced from each other by a distance which is sufficient to exhaust air from said pair and the pans upstream of them, but which is small compared to the horizontal dimensions of said pans, said pans including an initial pair adjacent said inlet, a terminal pair adjacent said outlet and at least one intermediate pair, each of the pans except those of said terminal pair being spaced from said vertical walls by distances which are sufficiently large to supply sufficient gas to pans downstream of it, but which are small compared to the horizontal dimensions of said pans;
   (f) means constructed and arranged to prevent substantial flow of gas between said vertical walls and the pans of said terminal pair;
   (g) support means of open structure above at least some of said pans other than those of one intermediate pair;
   (h) means for introducing gas of a first composition at said inlet; and
   (i) means for introducing gas of a second composition, different from said first composition, to the space between each of the pans of said one intermediate pair and the pan just above it, said space being otherwise substantially unobstructed.

5. An exposure chamber as defined in claim 4 wherein said gas inlet is at the top of said chamber.

6. An exposure chamber as defined in claim 4 wherein the distances between said pans and said vertical walls are in the range of substantially 1/20 to substantially 1/5 of the minimum horizontal dimension of said pans.

7. An exposure chamber as defined in claim 4, wherein said support means are cages for animals.

8. An exposure chamber as defined in claim 4 and comprising means for drawing gas from said outlet at a constant rate.

9. An exposure chamber as defined in claim 4 wherein said means for introducing a gas of a second composition is constructed and arranged to direct said gas toward said vertical walls and toward said outlet.

10. An exposure chamber as defined in claim 4, wherein the pans of each pair are also spaced vertically from each other.

11. An exposure chamber as defined in claim 10 wherein said gas inlet is at the top of said chamber.

12. An exposure chamber as defined in claim 4 wherein a plurality of pans are arranged in each of two vertical columns each pan of one column being spaced vertically and horizontally from an adjacent pan in the other column.

13. An exposure chamber as defined in claim 12, wherein said gas inlet is at the top of said chamber.

14. An exposure chamber as defined in claim 12 wherein said inlet is in alignment with the column in which the pans have a greater distance vertically from said inlet than the adjacent pans in the other column.

15. An exposure chamber as defined in claim 14, wherein said gas inlet is at the top of said chamber and is aligned with the column in which the pans are lower than the adjacent pans of the other column.

16. An exposure chamber as defined in claim 15 and comprising deflectors between the lowermost pan of each column and each of said vertical walls.

17. An exposure chamber as defined in claim 15, and comprising an upper transition piece which is an irregular pyramid having its apex in vertical alignment with the column in which the trays are lower than the adjacent trays of the other column and wherein said gas inlet and said inlet deflector are adjacent said apex.

18. An exposure chamber as defined in claim 17, and comprising a lower transition piece which is an inverted pyramid having a liquid outlet at its apex and wherein said air outlet is positioned in said lower transition piece above said apex.

* * * * *